United States Patent Office 3,248,384
Patented Apr. 26, 1966

3,248,384
BENZENESULFONYL-SEMICARBAZIDES AND
PROCESS FOR THEIR MANUFACTURE
Walter Aumüller, Kelkheim, Taunus, and Gerhard Korger and Helmut Weber, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 26, 1962, Ser. No. 247,373
Claims priority, application Germany, Dec. 27, 1961, F 35,667
1 Claim. (Cl. 260—239)

It has already been proposed to prepare 4-benzenesulfonyl - 1,1 - alkylene-semicarbazides which are distinguished by a strong antidiabetic activity by reacting benzenesulfonamides with alkylene-imino-isocyanates. Instead of these isocyanates there may also be used derivatives of said isocyanates such, for example, as alkylene-imino-carbamic acid chlorides, alkylene-imino-carbamic acid esters and 1,1-alkylene-semicarbazides. These processes do not meet the industrial requirements. The isocyanates themselves are extremely unstable, they also tend to dimerization and are, therefore, unsuitable as starting material for the reaction with benzenesulfonamides on an industrial scale (cf. Organic Reactions, vol. III, page 337) even when assuming their intermediary formation in the course of various further reactions (cf. the formation of hydrazine as by-product in the decomposition of urea according to Hoffmann). The corresponding carbamic acid chlorides which are obtained either as primary products in the preparation of isocyanates or by adding hydrogen chloride to the corresponding isocyanates, are in this connection likewise of no industrial use. Although it is possible to obtain 4-benzenesulfonyl-1,1-alkylene-semicarbazides from 1,1-alkylene-semicarbazides or alkylene-imino-carbamic acid esters—the preparation of which is known from the relevant literature—by reaction with benzenesulfonamides, advantageously in the form of their alkali metal salts, the yields are, however, so small that the preparing of the afore-mentioned semicarbazides cannot be considered as an industrial process. Also a somewhat modified process comprising the reaction of the sodium salts of benzenesulfonamide with 1,1-alkylene-semicarbazides acylated in the 4-position offers no advantages; on the contrary, the reaction proceeds less satisfactorily than with the use of non-acylated compounds.

It was, therefore, surprising that the reaction of benzenesulfonamides with 1,1-alkylene-semicarbazides carrying in 4-position one or two aromatic radicals that may be substituted—in the latter case these two radicals may be linked to one another directly or by an intermediary group—takes a smooth course and leads in an industrially simple manner to very good yields in pure 4-benzenesulfonyl-1,1-alkylene-semicarbazides which are effective hypoglycemic compounds.

The present invention thus relates to a process for the manufacture of benzenesulfonyl-semicarbazides of the general formula

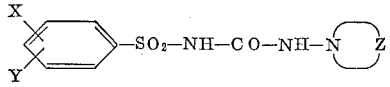

wherein X and Y are identical or different and represent hydrogen atoms, halogen atoms, alkyl and alkoxy groups having at most 6 carbon atoms and Y stands for the trifluoromethyl, the azido, the acetyl or the benzoyl radical, if X represents hydrogen and Z represents an alkylene group having 3 to 7 carbon atoms which may be substituted by further alkyl radicals of low molecular weight, which comprises reacting benzene-sulfonamides of the general formula

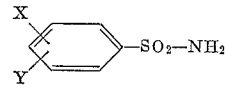

wherein X and Y have the meanings given above with alkylene-semicarbazides substituted in 4-position corresponding to the general formula

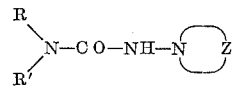

wherein R represents hydrogen or an aromatic radical and R' represents an aromatic radical wherein further two aromatic radicals may be linked to one another directly or by an intermediary group consisting of alkylene or a hetero atom and Z has the meaning given above.

In addition to the good accessibility of the starting materials and the very easy handling, the process of the present invention is characterized, above all, by a very rapid and distinct course of the reaction and by excellent yields.

The following compounds which suitably are used in the form of their salts are mentioned as benzene-sulfonamides:

4-chloro, 4-bromo- and 4-fluoro-benzene-sulfonamide,
2-methyl-, 3-methyl, 4-methyl-benzenesulfonamide,
3-ethyl-, 4-ethyl-benzenesulfonamide,
4-isopropyl-benzenesulfonamide,
3-methoxy-, 4-methoxy-benzenesulfonamide,
4-ethoxy-benzene-sulfonamide,
3-trifluoro-methyl-benzenesulfonamide,
4-tert. butyl-benzenesulfonamide,
4-isoamyl-benzenesulfonamide,
4-tert. amyl-benzenesulfonamide,
4-pentyl-(3')-benzenesulfonamide,
4-n-hexyl-benzenesulfonamide,
4-azido-benzenesulfonamide,
4-acetyl-benzenesulfonamide,
3,4-dimethyl-benzenesulfonamide,
3,4-dimethoxy-benzenesulfonamide,
3,4-dichloro-benzenesulfonamide,
3-chloro-4-methyl-benzenesulfonamide,
2-chloro-5-methyl-benzenesulfonamide,
3-chloro-4-methoxy-benzenesulfonamide,
3-methyl-4-methoxy-benzenesulfonamide,
3-fluoro-4-methyl-benzenesulfonamide.

Their compounds may easily be obtained according to methods known from the relevant literature.

As semicarbazide derivatives as they are used for the reaction with, for instance, the above-mentioned benzenesulfonamides the following compounds may be mentioned:

4,4-diphenyl-tetra-methylene-semicarbazide,
4,4-diphenyl-pentamethylene-semicarbazide,
4,4-diphenyl-hexa-methylene-semicarbazide,
4,4-di-(p-methyl-phenyl)-tetra-methylene-semicarbazide,
4,4-di-(p-methyl-phenyl)penta-methylene-semicarbazide,
4,4-di-(p-methyl-phenyl)-hexa-methylene-semi-carbazide,
4,4-di-(α-naphthyl)-tetra-methylene-semicarbazide,
4,4-di-(α-naphthyl)-penta-methylene-semicarbazide,
4,4-di-(α-naphthyl)-hexa-methylene-semicarbazide,
4,4-di-(p-chlorophenyl)-tetra-methylene-semicarbazide,
4,4-di-(p-chlorophenyl)-penta-methylene-semicarbazide,
4,4-di-(p-chlorophenyl)-hexa-methylene-semicarbazide,
4,4-di-(p-methoxyphenyl)-tetra-methylene-semicarbazide,
4,4-di-(p-methoxyphenyl) - penta - methylene - semicarbazide, 4,4-di-(p - methoxyphenyl) - hexamethylene - semicarbazide,
carbazol-9-carboxylic acid-penta-methylene-hydrazide,
phenothiazine-10-carboxylic acid-tetra-methylene - hydrazide,
phenothiazine-10-carboxylic acid-penta-methylene-hydrazide,
phenothiazine-10-carboxylic acid-hexa-methylene - hydrazide, or
phenoxazine-10-carboxylic acid penta - methylene - hydrazide.

These compounds may easily be prepared from the corresponding carbamic acid chlorides and 1,1-alkylene-hydrazines.

The process of the present invention is advantageously materialized by dissolving a correspondingly substituted benzene-sulfonamide in the form of an alkali metal salt, particularly the sodium salt, and a 1,1-alkylene-semicarbazide preferably disubstituted in 4,4-position — in equimolar amounts or by using an excessive amount of the second reaction component—in a solvent such as dimethylformamide, and heating the solution to about 100° C. In most cases the alkali metal salt of the benzene-sulfonylalkylene-semicarbazide that has formed crystallizes already after 15 to 20 minutes and can be converted after separation and acidification into the free compound. Yields amounting to 85–90% are the rule. If the crystallization does not proceed, the solvent is, for example, concentrated under reduced pressure to half of its amount and water as well as a small amount of an alkaline agent are added to the residue. By extraction with ether or a chlorinated hydrocarbon the secondary amine formed as by-product can be removed and after acidification (for instance by means of acetic acid) the desired sulfonyl-semicarbazide is obtained in pure state. If desired, the products obtained according to the process of the present invention can be purified by dissolving and reprecipitating them with dilute ammonia and dilute hydrochloric acid.

Instead of dimethyl-formamide other inert polar solvents such as, e.g., dimethyl-acetamide or dioxane can likewise be used. The amounts in which the solvents are used should be calculated so that both reactants are dissolved. The reaction conditions may be varied to a large extent.

The benzene-sulfonyl-semicarbazides obtained according to the process of the present invention are valuable medicaments characterized, in particular, by a good hypoglycemic activity and a low toxicity. For example, as shown by the following table the 4-(4'-ethyl-benzenesulfonyl)-1,1-penta-methylene - semicarbazide lowers the blood sugar level of test animals for a much longer period than the N - (4 - methyl-benzene-sulfonyl)-N-n-butyl-urea known as oral antidiabetic. When examining the compounds they are given to rabbits in a dose of 400 milligrams/kilogram in the form of the sodium salts, to dogs in a dose of 5 milligrams/kilogram in the form of the free base.

| | 4-(4-ethyl-benzenesulfonyl)-1,1 pentamethylene-semicarbazide | | N-(4-methyl-benzenesulfonyl)-N'-n-butyl-urea | |
|---|---|---|---|---|
| Time in hours | Hypoglycemic rabbit | Action in percent dog | Hypoglycemic rabbit | Action in percent dog |
| 2 | 25 | 3 | 40 | 22 |
| 6 | 47 | 43 | 40 | 24 |
| 24 | 40 | 48 | 0 | 7 |
| 48 | 0 | 43 | 0 | 0 |
| 72 | 0 | 17 | 0 | 0 |
| 96 | 0 | 12 | 0 | 0 |

The products obtained by the process of the present invention are preferably destined for the manufacture of medicaments showing a hypoglycemic action which may be orally administered in the therapy of diabetes mellitus. The sulfonyl semicarbazides may be used as such or in the form of their salts with bases or acids or in the presence of substances leading to salt formation. For the salt formation there may be used alkaline agents such as alkali metal hydroxides or alkaline earth metal hydroxides, alkali metal carbonates or alkaline earth metal carbonates, alkali metal bicarbonates or alkaline earth metal bicarbonates as well as physiologically tolerated organic bases, furthermore acids such as hydrochloric acid, hydrobromic acid, sulfuric acid and amidosulfonic acid.

As medicinal preparations there enter into consideration preferably tablets containing the compounds obtained according to the invention, in a quantity of 0.05 to 0.5 gram per dosage unit in conjunction with the usual adjuvants and carrier substances such as talk, starch, lactose, tragacanth, magnesium stearate and the like.

The following examples serve to illustrate the invention but they are not intended to limit it thereto:

*Example 1*

(a) *4 - (4' - chloro - benzenesulfonyl) - 1,1 - pentamethylene-semicarbazide.*—1.07 grams of 4-chloro-benzenesulfonamide-sodium and 2.95 grams of 4,4-diphenyl-1,1-pentamethylene-semicarbazide in 25 cc. of dimethyl-formamide are heated for 15 to 20 minutes in the oil bath to 100° C. After a few minutes the substances form a clear solution and crystallation sets in. The sodium salt of 4 - (4' - chloro - benzenesulfonyl) - 1,1 - pentamethylene-semicarbazide that has separated is filtered off with suction and washed with methanol. The yield amounts to 90% referred to the sodium salt of 4-chloro-benzenesulfonamide. The sodium salt is dissolved in water and upon acidification with dilute acetic acid the free 4-'4'-chloro - benzenesulfonyl) - 1,1 - pentamethylene - semicarbazide is obtained which after a single recrystallization from ethyl-alcohol and some drops of dimethyl-formamide melts at 212–214° C.

(b) In an analogous manner there is obtained from 0.89 gram of benzenesulfonamide-sodium and 2.95 grams of 4,4 - diphenyl - 1,1 - pentamethylene - semicarbazide the sodium salt of 4-benzenesulfonyl-1,1-pentamethylene-semicarbazide in a yield of 94%; it is converted by acidification into the free compound melting at 173–175° C. (from a mixture of methanol and dimethyl-formamide).

(c) By starting from 1.04 grams of the sodium salt of 3,4-dimethyl-benzenesulfonamide and 2.95 g. of 4,4-diphenyl-1,1-pentamethylene-semicarbazide the sodium salt of 4 - (3'4' - dimethyl - benzenesulfonyl) - 1,1 - pentamethylene-semicarbazide is obtained in a yield of 84%. After recrystallization from aqueous methanol the free compound melts at 165–167° C.

(d) In the same manner the reaction of 1.05 grams of the sodium salt of 4-methoxy-benzenesulfonamide with 2.95 grams of 4,4-diphenyl-1,1-pentamethylene-semicarbazide leads to the sodium salt of 4-(4'methoxy-benzenesulfonyl)-1,1-pentamethylene-semicarbazide. It is obtained in a yield of 91%. After acidification and recrystallization from methanol the free compound melts at 170–172° C.

*Example 2*

*4 - (2' - methyl - benzenesulfonyl) - 1,1 - pentamethylene-semicarbazide.*—0.97 gram of the sodium salt of 2-methyl-benzenesulfonamide and 2.95 grams of 4,4-diphenyl-1,1-pentamethylene-semicarbazide are heated for 15 to 20 minutes to 100° C. in 25 cc. of dimethylformamide. The clear solution is concentrated under reduced pressure to half its amount and water and a few drops of 2N-sodium hydroxide solution are added. The reaction mixture is shaken out with ether, the aqueous phase is separated and filtered once over charcoal. The crystalline precipitate obtained after acidification with dilute acetic acid is filtered off with suction and dried. The 4-(2'-methyl - benzenesulfonyl) - 1,1 - pentamethylene - semicarbazide obtained melts at 172–174° C. after a single recrystallization from methanol.

*Example 3*

4 - (4' - methyl - benzenesulfonyl) - 1,1 - pentamethylene-semicarbazide.—0.97 gram of the sodium salt of toluene-sulfonamide and 3.23 grams of 4,4-di-(p-tolyl)-1,1-pentamethylene-semicarbazide in 25 cc. of dimethylformamide are heated for 15 to 20 minutes in the oil bath to 100° C. The clear solution obtained is concentrated under reduced pressure to half its amount, water and a few drops of dilute sodium hydroxide solution are then added. After a single extraction with ether the aqueous phase is filtered and acidified by means of dilute acetic acid. The 4 - (4' - methyl - benzenesulfonyl) - 1,1-pentamethylene-semicarbazide is obtained in a yield of 89%. After recrystallization from dilute alcohol it melts at 203–205° C.

*Example 4*

(a) 4 - (4' - methyl - benzenesulfonyl) - 1,1 - hexamethylene-semicarbazide.—1.93 grams of the sodium salt of p-toluene-sulfonamide and 6.18 grams of 4,4-diphenyl-1,1-hexamethylene-semicarbazide are heated in 75 cc. of dimethyl-formamide for 15 to 20 minutes in the oil bath to 100° C. After filtering with suction and washing with methanol the yield in sodium salt of the product obtained according to the process of the invention amounts to 85%. The 4 - (4' - methyl - benzene - sulfonyl) - 1,1-hexamethylene - semicarbazide obtained therefrom by acidification with dilute acetic acid melts at 169–171° C. after having been recrystallized from a mixture of methanol and dimethylformamide.

(b) In an analogous manner the 4-(4'-methyl-benzenesulfonyl)-1,1-hexamethylene-semicarbazide is obtained in a yield of 80% from 0.97 gram of the sodium salt of p-toluene-sulfonamide and 3.37 grams of 4,4-di-(4'-methyl-benzene)-1,1-hexamethylene-semicarbazide.

*Example 5*

4 - (4' - chloro - benzenesulfonyl) -1,1 -hexamethylene-semicarbazide.—2.13 grams of the sodium salt of 4-chloro-benzenesulfonamide and 6.18 grams of 4,4-diphenyl-1,1-hexamethylene-semicarbazide are dissolved in 50 milliliters of dimethyl-formamide. The reaction mixture is heated with stirring for 15 to 20 minutes to 100° C. The reaction product that has precipitated is filtered off with suction and after washing with methanol it is obtained in a yield of 93% in the form of the sodium salt. After acidification with dilute acetic acid the 4-(4'-chloro-benzenesulfonyl) - 1,1 - hexamethylene - semicarbazide is formed. After recrystallization from a mixture of dimethyl-formamide and methanol the melting point of the substance amounts to 190–192° C.

*Example 6*

4 - (4' - ethyl - benzenesulfonyl) - 1,1 - pentamethylene-semicarbazide.—(a) 6.5 grams of 1-(phenothiazine-10-carbonyl)-2,2-pentamethylene-hydrazine and 4.1 grams of the sodium salt of 4-ethyl-benzene-sulfonamide are heated in 40 milliliters of dimethylformamide for 1 hour to 100° C. Half the dimethylformamide is distilled off under reduced pressure and water is added to the residue. The mixture is rendered alkaline by means of dilute ammonia; the undissolved phenothiazine formed in the course of the reaction is separated off. The filtrate is clarified with charcoal, acidified by means of acetic acid and the precipitate that has separated is filtered off with suction. After recrystallization from methanol the 4 - (4' - ethyl - benzenesulfonyl) - 1,1 - pentamethylene-semicarbazide is obtained in good yield. It melts at 175–177° C.

(b) In an analogous manner and with the use of 1 - (phenothiazine - 10 - carbonyl) - 2,2 - hexamethylene-hydrazine there is obtained the 4-(4'-ethyl-benzenesulfonyl)-1,1-hexamethylene-semicarbazide which after recrystallization from methanol melts at 154–155° C.

*Example 7*

4-(4' - chloro - benzenesulfonyl) - 1,1 - pentamethylene-semicarbazide.—By reaction of 6.5 grams of 1-(phenothiazine-10-carbonyl)-2,2-pentamethylene-hydrazine with 4.2 grams of the sodium salt of 4-chloro-benzenesulfonamide in 40 milliliters of dimethyl-formamide 4-(4'-chloro - benzenesulfonyl) - 1,1 - pentamethylene - semicarbazide is obtained in a yield of 70–75% of the theory according to the directions given in Example 6. After recrystallization from a mixture of dimethylformamide and methanol the substance melts at 209–211° C.

*Example 8*

(a) 4-(4'-methyl-benzenesulfonyl)-1,1-pentamethylene-semicarbazide.—5.86 grams of 1-(carbazol-9-carbonyl)-2,2-pentamethylene-hydrazine of a melting point of 182–183° C. and 3.8 grams of the sodium salt of 4-methyl-benzenesulfonamide are heated in 40 milliliters of dimethyl-formamide for 1 hour to 100° C. Half the dimethyl-formamide is distilled off under reduced pressure and water is added to the residue. The mixture is rendered alkaline by means of dilute ammonia and the undissolved carbazole formed in the course of the reaction is separated. The filtrate is clarified with charcoal acidified with acetic acid and the separated precipitate is filtered off with suction. After recrystallization from methanol the 4-(4'-methyl-benzenesulfonyl)-1,1-pentamethylene-semicarbazide is obtained in a yield of 75 to 80% and melts at 202–204° C.

(b) In an analogous manner and with the use of 1-(carbazol-9-carbonyl)-2,2 - hexamethylene - hydrazine melting at 177–178° C. the 4-(4'-methyl-benzenesulfonyl)-1,1-hexamethylene-semicarbazide is obtained which after recrystallization from methanol melts at 163–166° C.

*Example 9*

(a) 4-(4'-chloro-benzenesulfonyl)-1,1-pentamethylene-semicarbazide.—By reaction of 5.86 grams of 1-(carbazol-9 - carbonyl) - 2,2 - pentamethylene - hydrazine with 4.27 grams of the sodium salt of 4-chloro-benzenesulfonamide in 40 milliliters of dimethylformamide the 4-(4'-chloro-benzenesulfonyl)-1,1-pentamethylene-semicarbazide is obtained in a yield of 75% of the theory, according to the directions given in Example 8. After recrystallization from dimethyl-formamide and methanol the melting point amounts to 211–213° C.

(b) In an analogous manner and with the use of 1-(carbazol-9-carbonyl)-2,2-hexamethylene-hydrazine the 4 - (4' - chloro - benzenesulfonyl) - 1,1 - hexamethylene-semicarbazide is obtained in good yield. It melts at 196–197° C.

*Example 10*

4-(3-ethyl-benzenesulfonyl)-1,1-pentamethylene - semicarbazide.—1.04 grams of the sodium salt of 3-ethyl-benzenesulfonamide and 2.95 grams of 4,4-diphenyl-1,1-pentamethylene-semicarbazide are heated in 25 cc. of dimethylformamide for 15 to 20 minutes to 100° C. The reaction mixture is concentrated under reduced pressure to half its volume, water and some drops of 2N-sodium hydroxide solution are added. The reaction solution is shaken out with ether, the aqueous phase is separated and filtered once over charcoal. The crystalline precipitate obtained after acidification with dilute acetic acid is filtered with suction and dried. The 4-(3-ethyl-benzenesulfonyl)-1,1-pentamethylene-semicarbazide obtained melts at 135–137° C. after a single recrystallization from methanol.

In an analogous manner there are obtained by reaction of the corresponding starting components:

4-(4-methyl-benzenesulfonyl)-1,1-tetramethylene-semicarbazide melting at 180–182° C. (after recrystallization from methanol/dimethylformamide), 4-(4-isopropyl-benzenesulfonyl)-1,1-tetramethylene-semicarbazide melting at 174–175° C. (from ethanol/water), 4-(4-tert.butyl-benzenesulfonyl-1,1-tetramethylene-semicarbazide melting at 186–187° C. (from isopropanol), 4-(2-methyl-benzenesulfonyl)-1,1-pentamethylene-semicarbazide melting at 178° C. (from methanol), 4-benzenesulfonyl-1,1-(2'-methyl-pentamethylene)-semicarbazide melting at 191–193° C. (from methanol), 4-benzenesulfonyl-1,1-hexamethylene-semicarbazide melting at 159–161° C. (from methanol), 4-(3'-fluoro-4'-methyl-benzenesulfonyl)-1,1-pentamethylene-semicarbazide melting at 150–151° C. (from methanol), 4-(3'-chloro-4'-methoxy-benzenesulfonyl)-1,1-tetramethylene-semicarbazide, melting at 144–145° C. (from aqueous methanol), 4-(3'-chloro-4'-methoxy-benzenesulfonyl)-1,1-pentamethylene-semicarbazide melting at 146–147° C. (from aqueous methanol), 4-(3',4'-dichloro-benzenesulfonyl)-1,1-hexamethylene-semicarbazide melting at 166° C. (from ethanol), 4-(3'-methoxy-5'chloro-benzenesulfonyl)-1,1-hexamethylene-semicarbazide melting at 173–175° C. (from dimethylformamide and methanol), 4-(3'-methyl-4'-methoxy-benzenesulfonyl)-1,1-tetramethylene-semicarbazide, melting at 153–155° C., 4-(3'-methyl-4'-methoxy-benzenesulfonyl)-1,1-pentamethylene-semicarbazide, melting at 158–160° C. (from ethanol/water), 4-(3',4'-dimethoxy-benzenesulfonyl)-1,1-pentamethylene-semicarbazide, melting at 154–156° C. (from ethanol/water), 4-(4-n-propyl-benzenesulfonyl)-1,1-pentamethylene-semicarbazide melting at 144–146° C. (from ethanol/water), 4-(4-ethyl-benzenesulfonyl)-1,1-pentamethylene-semicarbazide melting at 174–176° C. (from methanol), 4-(2-chloro-benzenesulfonyl)-1,1-hexamethylene-semicarbazide melting at 164–166° C. (from ethanol), 4-(3-chloro-benzenesulfonyl)-1,1-hexamethylene-semicarbazide melting at 155° C. (from ethanol), 4-(2-bromo-benzenesulfonyl)-1,1-hexamethylene-semicarbazide melting at 174–176° C. with decomposition from ethanol), 4-(3-bromo-benzenesulfonyl)-1,1-hexamethylene-semicarbazide melting at 159–161° C. (from ethanol), 4-(3-methyl-benzenesulfonyl)-1,1-hexamethylene-semicarbazide melting at 141–142° C. (from methanol), 4-(4-ethoxy-benzenesulfonyl)-1,1-hexamethylene-semicarbazide melting at 170–172° C. (from methanol), 4-(4-methoxy-benzenesulfonyl)-1,1-($\alpha,\alpha$-dimethyl-trimethylene)-semicarbazide melting at 168–170° C. (from water/ethanol), 4-(3-trifluoromethyl-benzenesulfonyl)-1,1-hexamethylene-semicarbazide melting at 159–161° C. (from water/ethanol), 4-(4-methyl-benzenesulfonyl)-1,1-heptamethylene-semicarbazide, melting at 138–139° C. (from methanol/water), 4-(4-azido-benzenesulfonyl)-1,1-hexamethylene-semicarbazide, melting at 163–164° C. with decomposition (from acetic acid ester), 4-(4-azido-benzenesulfonyl)-1,1-($\gamma$-methyl-pentamethylene)-semicarbazide melting at 187–189° C. with decomposition (from acetone).

*Example 11*

*4 - (4' - azido - benzenesulfonyl)-1,1-pentamethylene-semicarbazide.*—11 grams of the sodium salt of 4-azido-benzene-sulfonamide are heated with 29.5 grams of 4,4-diphenyl-1,1-pentamethylene-semicarbazide in 100 cc. of dimethyl-formamide for 1 hour in the oil bath to 100° C. After 5 minutes a crystalline precipitate separates from the solution formed at first. After termination of the heating and after cooling the precipitate is filtered off with suction and washed with acetone. The yield of crude sodium salt of 4-(4'-azido-benzesulfonyl)-1,1-pentamethylene-semicarbazide thus isolated amount to 71% of the theory. The free compound that is obtained by dissolving the sodium salt in water and acidifying it with acetic acid, melts at 170–171° C. with decomposition.

*Example 12*

*4-(4'-acetyl - benzene - sulfonyl) - 1,1-pentamethylene-semicarbazide.*—4.4 grams of the sodium salt of 4-acetyl-benzene-sulfonamide and 11.8 grams of 4,4-diphenyl-1,1-pentamethylene-semicarbazide are dissolved by heating them in 40 milliliters of dimethyl-formamide to 100° C. in the oil bath. After some minutes a crystalline precipitate of the sodium salt of 4-(4'-acetyl-benzene-sulfonyl)-1,1-pentamethylene-semicarbazide separates. It is allowed to cool, the precipitate is filtered off with suction and washed with acetone. The yield in crude sodium salt amounts to 85% of the theory. By dissolving the salt in water and acidifying it with acetic acid the 4-(4'-acetyl-benzene-sulfonyl) - 1,1 - pentamethylene - semicarbazide is obtained which melts at 196–198° C.

*Example 13*

*4-(4'-benzoyl-benzene-sulfonyl) - 1,1 - pentamethylene-semicarbazide.*—According to the method described in Example 11 there is obtained by heating a solution of 5.66 grams of the sodium salt of benzophenone-4-sulfonamide and 11.8 grams of 4,4-diphenyl-1,1-pentamethylene-semicarbazide in 40 milliliters of dimethyl-formamide to 100° C., the sodium salt of 4-(4'-benzoyl-benzene-sulfonyl)-1,1-pentamethylene-semicarbazide in a yield of 88 grams. The melting point of the free compound which is obtained by acidifying the salt solution in water amounts to 192–194° C.

*Example 14*

*4-(3' - trifluoromethyl - benzene - sulfonyl) - 1,1 - pentamethylene-semicarbazide.*—33 grams of the sodium salt of m-trifluoro-methyl-benzene-sulfonamide and 74.7 grams of 4,4-diphenyl-1,1-pentamethylene-semicarbazide are dissolved in 260 cc. of dimethyl-formamide by heating the mass to 100° C. in the oil bath. After 15 minutes the 4 - (3' - trifluoro - methyl-benzene-sulfonyl)-1,1-pentamethylene-semicarbazide separates in the form of a crystalline precipitate. After one hour the mixture is allowed to cool, the salt is filtered off with suction, washed with acetone and dried. The yield amounts to 94% of the theory. By dissolving the salt in water and acidifying it with acetic acid the free 4-(3'-trifluoro-methyl-benzene-sulfonyl)-1,1-pentamethylene-semicarbazide is obtained which melts at 172–174° C. (with decomposition).

We claim:

A process for the manufacture of benzenesulfonyl semicarbazides of the formula

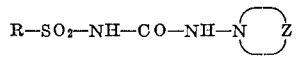

in which R is a member selected from the group consisting of

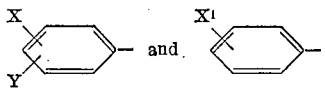

X and Y each are members selected from the group consisting of hydrogen, halogen, alkyl and alkoxy having at most 6 carbon atoms, $X^1$ is a member selected from the group consisting of trifluoromethyl, azido, acetyl and benzoyl and Z is a member selected from the group consisting of alkylene having from 3 to 7 carbon atoms and alkylene having from 3 to 7 carbon atoms substituted by alkyl groups which have at most 4 carbon atoms which comprises reacting a benzenesulfonamide of the formula

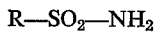

in which R has the meaning given above, with an alkylene-semicarbazide of the formula

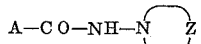

in which Z has the meaning given above and A is a member selected from the group consisting of

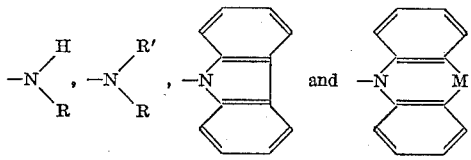

wherein R and R' are members selected from the group consisting of phenyl, chlorophenyl, methyl-phenyl, methoxy-phenyl and naphthyl and M is a member selected from the group consisting of alkylene, oxygen and sulfur.

References Cited by the Examiner

UNITED STATES PATENTS 3,005,022 10/1961 McLamore et al. _____ 260—553
3,041,331 6/1962 Wright _____ 260—239

FOREIGN PATENTS 506,631 9/1957 Belgium.

OTHER REFERENCES

Chemical Abstracts I, vol. 31, col. 3891 (1937), abstract of Crawford et al., J. Roy. Tech. Coll. (Glasgow), vol. 4, pages 28–31 (1937).

Chemical Abstracts II, vol. 34, col. 5063 (1940), abstract of Crawford, J. Roy. Tech. Coll. (Glasgow), vol. 4, pages 607–617 (1940).

Chemical Abstracts III, vol. 39, col. 4595 (1945), abstract of Ghosh, J. Indian Chem. Soc., vol. 22, pages 27–28 (1945).

WALTER A. MODANCE, *Primary Examiner.*

NICHOLAS S. RIZZO, *Examiner.*